United States Patent [19]

Oehmichen

[11] Patent Number: 5,794,088
[45] Date of Patent: Aug. 11, 1998

[54] MECHANICAL STEREO REFLEX CAMERA

[75] Inventor: Eckhart Oehmichen, Stuttgart, Germany

[73] Assignee: RBT Raumbildtechnik GmbH, Aichwald, Germany

[21] Appl. No.: 854,545

[22] Filed: May 12, 1997

[30] Foreign Application Priority Data

May 22, 1996 [DE] Germany .................. 196 20 510.0

[51] Int. Cl.$^6$ .................................................. G03B 35/00
[52] U.S. Cl. ............................................................. 396/326
[58] Field of Search ................................. 396/322, 326, 396/333

[56] References Cited

U.S. PATENT DOCUMENTS 2,922,349  1/1960  Rochwite ........................... 396/326
3,018,708  1/1962  Rentschler ......................... 396/326

Primary Examiner—David M. Gray
Attorney, Agent, or Firm—Spencer & Frank

[57] ABSTRACT

A mechanical stereo reflex camera is disclosed which is composed of two commercially available mono reflex cameras. The drives (4l,4r) of the two leaf shutters (3l,3r) are cocked together. The release movements are transmitted from the drive of one of the shutters to the drive of the other by means of a two-armed lever.

5 Claims, 1 Drawing Sheet

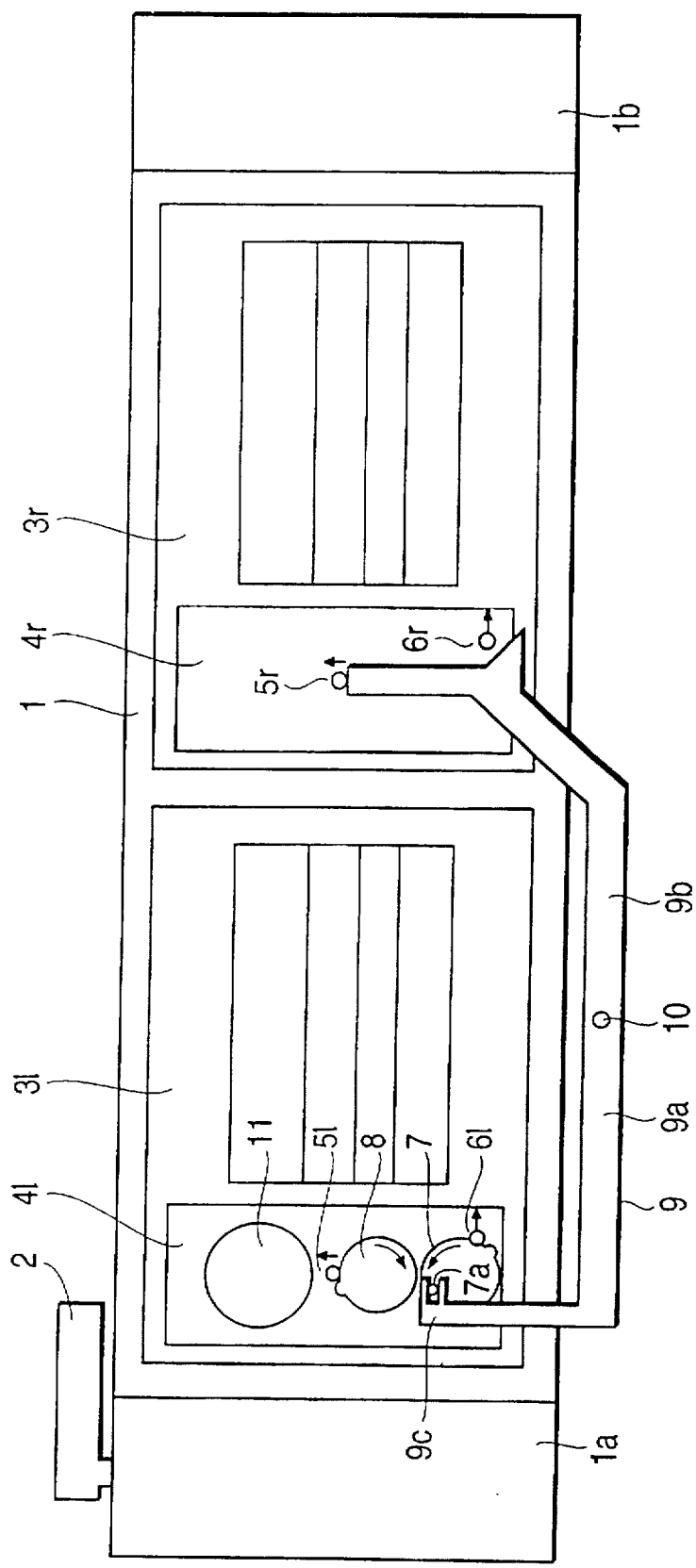

MECHANICAL STEREO REFLEX CAMERA

This application claims the priority of German Application No 196:20 519.0 filed May 22, 1996, and the subject matter of that application is incorporated herein by reference.

The Invention relates to a mechanical stereo reflex camera as set forth in the pre-amble of claim 1.

Such a camera Is not known In the prior art.

In French Patent FR 2538132 A a partly mechanical stereo reflex camera is described having two leaf shutters with two blinds, in which the two leaf shutters are coupled mechanically for cocking by means of an toothed wheels/ lever arrangement and in which for the synchronous releasing of the shutters an electronic computer is provided, which controls by means of electromagnets the opening and the closing of the blinds and with Which an adjustment of the opening time is possible.

In German Patent DE 10 81 304 B1 a stereo finder camera is described having a shutter composed of two superimposed slides with exposure openings which are moved to and fro during exposure. The slides are driven by means of a double-armed swinglever via pins guided in slots.

Starting from FR 25 38 132A it is the object of the invention to provide a fully mechanical stereo reflex camera. This object is attained by the features of claim 1.

An advantage of the hovel stereo reflex camera Is that it not only is suitable for high-volume production but also can be assembled from two commercially available mono reflex cameras at justifiable cost.

Further advantageous aspects of the invention are defined in the subclaims.

The invention Will become more apparent from the following description of an embodiment When taken In conjunction with the accompanying drawing, which is a front view of the rear part I of the camera body. The front part, which contains the mirror boxes, has been removed. The film wind space 1a is indicated at the left, and the film cartridge 1b at the right. Both are accessible from the rear. The lever 2 which must be actuated to advance the film and cock the shutters can be seen at the top of the body. Two leaf shutters 3l (left) and 3r (right) are provided in the part 1.

In the embodiment, the stereo reflex camera was formed by uniting two commercially available mono reflex cameras of the Yashica FX 3 Super 2000 type of Kyocera, which Use fully mechanical leaf shutters of Copal. Knowledge of the design and operation of that camera, including the shutter, is required for an understanding of the following description.

The leaf shutters 3l and 3r include drives 4l and 4r, respectively. Both drives have winding levers (not shown) for the actuating springs of the leaf blinds. When the lever 2 is actuated, the two winding levers are simultaneously brought to the cocked position via a linkage (not shown) extending in the bottom of part 1.

Each of the two drives has two pins which must be moved in the direction shown to release the leaf blinds. These are the pins 5l and 5r for the rear blinds (film side) and the pins 6l and 6r for the front blinds.

The left-hand leaf shutter is the complete Copal shutter except for the modification described in the following, and therefore has, besides the drive 4l, a timing device 11 and a pair of wheels 7, 8 which mesh in the range of rotation. Each of the two wheels has a cam for moving the associated pin 5l, 6l. The shutters are shown in the cocked position. After release of the shutter, the wheels turn in the directions of the arrows and the cams move the pins 5l and 6l, whereby the associated blinds are released. The time interval between the two movements of the blinds is determined by the setting of the timing device 11.

According to the invention, the wheel 7 is provided with a pin 7a extending parallel to the axis of this wheel.

The right-hand leaf shutter contains only the drive 4r. Parts corresponding to the parts 7,8, and 11 are not present. To release the blinds of the right-hand shutter 3r, the pins 5r and 6r are moved via a two-armed lever 9 which is rotatable approximately at its center about a shaft supported by double ball bearings. It can be seen that a substantial portion of the lever 9 extends below the bottom surface of part 1.

The left arm of the lever 9 is designated 9a and the right arm 9b. The left arm ends in a fork 9c which is engaged by the pin 7a. The right arm 9b is flattened at the end in a direction parallel to the leaves, so that, if the lever 9 is moved counterclockwise,the pin 5r will be moved upward and the associated blind will be released. Below its end, the lever arm 9b has a surface inclined at approximately 45 degrees for moving the pin 6r toward the right.

It can be seen that the movement of the wheel 7,which actuates directly only the pin 6l, is transmitted via the pin 7a and the lever with the fork 9c to the two pins 5r and 6r.

To precisely set the release times of the pins 5r and 6r, angular members movable and lockable in oblong holes may be provided at the end and at the inclined surface of the lever arm 9b.

The transmission of the movement from the left-hand shutter 3l to the right-hand shutter 3r is practically inertialess. Difficulties may be encountered at the shortest exposure time. It may therefore become necessary to block this exposure time in a suitable manner.

What is claimed is:

1. A mechanical stereo reflex camera having two leaf shutters with two blinds each, characterized in that the two shutters (3l,3r) can be cocked together,that each of the shutters have a drive (4l,4r) which is provided with seperate actuating members (5l, 5r; 6l, 6r) for opening and closing the blinds, that one (4l) of the drives (4l,4r) comprises an adjustable timing device (11) and two cam wheels (7,8) for releasing its actuating members (5l, 6l), and that the two actuating members (5r,6r) of the second drive (4r) are released via the right arm (9b) of a two-armed lever (9) whose left arm (9a) is moved by one (7) of the cam wheels (7,8) of the first drive (4l).

2. A camera as claimed in claim 1, characterized in that the cam wheel is associated with the blind, which is folded together when the shutter is cocked.

3. A camera as claimed in claim 1, characterized in that the left arm of the lever (9) comprises a fork (9c) which is engaged by a pin (7a) provided on, and extending parallel to the axis of said one (7) of the cam wheels (7,8).

4. A camera as claimed in claim 2, characterized in that the left arm of the lever (9) comprises a fork (9c) which is engaged by a pin (7a) provided on, and extending parallel to the axis of said one (7) of the cam wheels (7,8).

5. A camera as claimed in claim 1, characterized in that the right arm (9b) of the lever is shaped in such a way that, if the lever is moved counterclockwise, one (5r) of the actuating members (5r, 6r) of the second drive (4r) will be moved upward and the other (6r) to the right.

* * * * *